United States Patent
Bradburn

(10) Patent No.: US 9,258,419 B2
(45) Date of Patent: Feb. 9, 2016

(54) SYSTEM AND METHOD FOR MANAGING EMERGENCY CALLS

(75) Inventor: Travis L. Bradburn, Ortonville, MI (US)

(73) Assignee: General Motors LLC, Detroit, MI (US)

( * ) Notice: Subject to any disclaimer, the term of this patent is extended or adjusted under 35 U.S.C. 154(b) by 1992 days.

(21) Appl. No.: 12/411,330

(22) Filed: Mar. 25, 2009

(65) Prior Publication Data

US 2010/0246781 A1   Sep. 30, 2010

(51) Int. Cl.
*H04M 11/04* (2006.01)
*H04B 7/00* (2006.01)
*H04M 3/51* (2006.01)

(52) U.S. Cl.
CPC ............ *H04M 3/5116* (2013.01); *H04M 11/04* (2013.01); *H04M 2242/04* (2013.01)

(58) Field of Classification Search
USPC ................. 379/37, 45, 46, 47, 48, 49, 50, 51; 455/404.1, 404.2, 521
See application file for complete search history.

(56) References Cited

U.S. PATENT DOCUMENTS

| | | | |
|---|---|---|---|
| 6,754,335 B1 * | 6/2004 | Shaffer et al. | 379/266.02 |
| 6,771,742 B2 | 8/2004 | Mathis et al. | |
| 7,177,397 B2 | 2/2007 | McCalmont et al. | |
| 7,436,937 B2 | 10/2008 | Clawson | |
| 7,466,218 B2 | 12/2008 | Oesterling | |
| 2002/0098844 A1 * | 7/2002 | Friedenfelds et al. | 455/445 |
| 2002/0106059 A1 * | 8/2002 | Kroll et al. | 379/45 |
| 2008/0304629 A1 * | 12/2008 | Buscemi et al. | 379/45 |

* cited by examiner

*Primary Examiner* — Duc Nguyen
*Assistant Examiner* — Kile Blair
(74) *Attorney, Agent, or Firm* — Dierker & Associates, P.C.

(57) ABSTRACT

A system and method for managing emergency calls are disclosed herein. The method includes receiving an emergency related call at a call center, and during the emergency related call, retrieving information related to i) a type of incident being reported, ii) a location of the incident being reported, and iii) a description of the incident being reported. A public safety answering point to notify of the incident is identified, where such identification is based upon at least some of the retrieved information. A database is searched for outgoing calls to the identified public safety answering point, and based upon results from the searching, a determination is made as to whether to contact the identified public safety answering point.

16 Claims, 2 Drawing Sheets

SYSTEM AND METHOD FOR MANAGING EMERGENCY CALLS

TECHNICAL FIELD

The present disclosure relates generally to systems and methods for managing emergency calls.

BACKGROUND

Some vehicle communication systems allow drivers to contact a particular service provider in the event of an emergency. The service provider may be able to determine the location of the driver, and then contact a public safety or service answering point (PSAP) that is located within the boundary within which the vehicle is located. To assist the service provider, a database of public safety answering geographic boundaries and the phone numbers may be accessed.

SUMMARY

A system and method for managing emergency calls are disclosed herein. The method includes receiving an emergency related call at a call center, and during the emergency related call, retrieving information related to i) a type of incident being reported, ii) a location of the incident being reported, and iii) a description of the incident being reported. A public safety/service answering point to notify of the incident is identified, where such identification is based upon at least some of the retrieved information. A database is searched for outgoing calls to the identified public safety answering point, and based upon results from the searching, a determination is made as to whether to contact the identified public safety answering point.

BRIEF DESCRIPTION OF THE DRAWINGS

Features and advantages of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Embodiments of the system and method disclosed herein advantageously enable call center advisors to adequately manage emergency related phone calls without redundantly reporting the occurrence of a particular incident to a public safety/service answering point (PSAP). Prior to reporting an incident, the advisor is able to determine whether the incident reported during the emergency related phone call has already been reported to the public safety/service answering point. This advantageously reduces the number of redundant reports made to the public safety answering point. Such a reduction may be desirable so that call center advisors and public safety answering point advisors are not transmitting and receiving information that has already been reported.

It is to be understood that, as used herein, the term "user" includes vehicle owners, operators, and/or passengers. It is to be further understood that the term "user" may be used interchangeably with subscriber/service subscriber. A subscriber is also a person or persons who have signed up to receive telematics services which are provided, at least in part, by a call center 24.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

Figure 1:
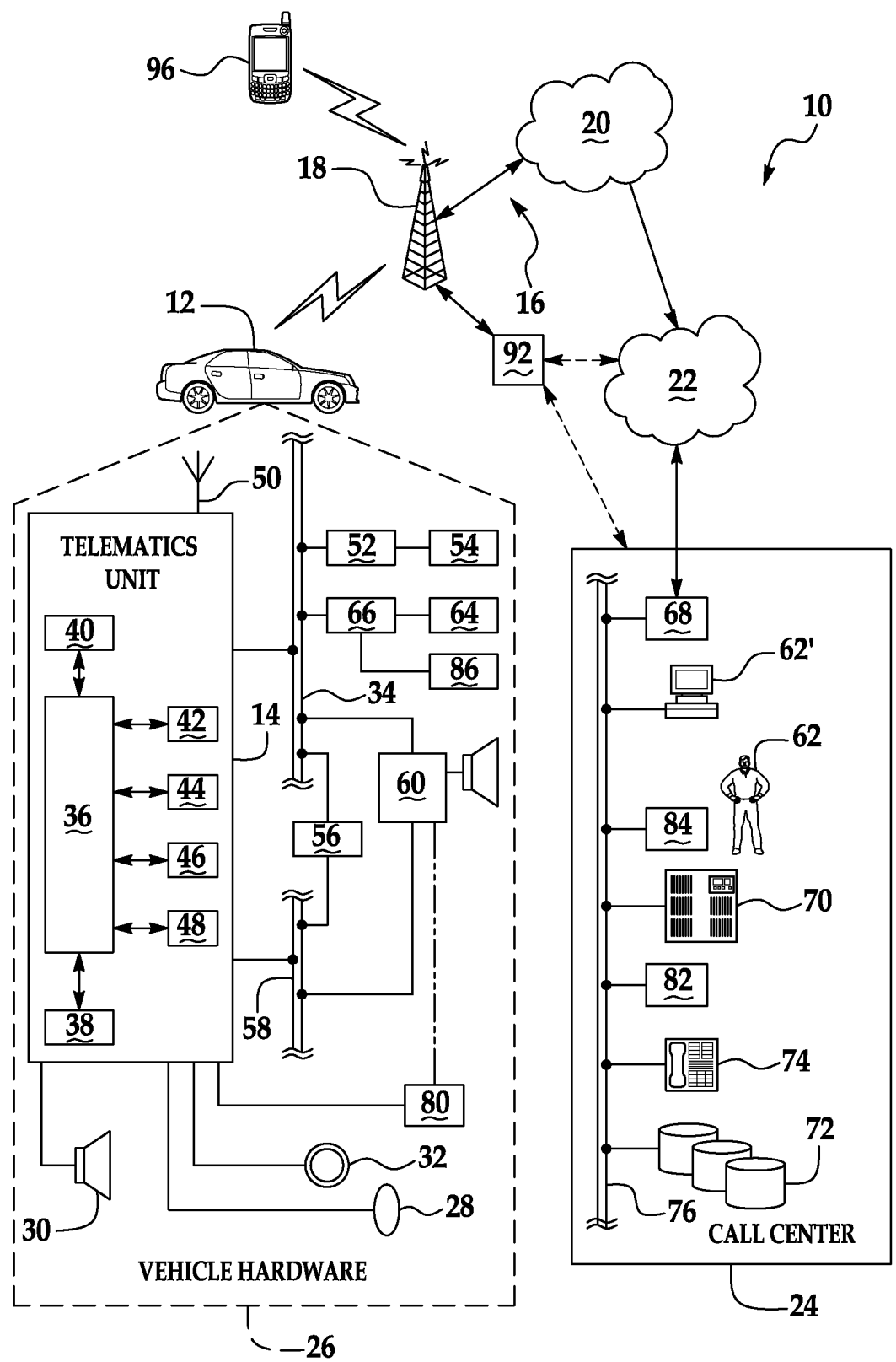
FIG. 1 is a schematic diagram of a system for managing emergency calls.

Referring now to FIG. 1, the system 10 includes a vehicle 12 having a telematics unit 14 therein or another wireless or non-wireless device 96, a wireless carrier/communication system 16 (including, but not limited to, one or more cell towers 18, one or more base stations and/or mobile switching centers (MSCs) 20, and one or more service providers (not shown)), one or more land networks 22, one or more call centers 24, and one or more public safety answering points 92. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

The wireless or non-wireless device 96 is a cellular telephone (or a device including cellular technology therein (e.g., a PDA)) or a landline telephone that is equipped with suitable hardware and software that enables it to communicate (e.g., transmit and/or receive voice and data communications) over the wireless carrier/communication system 16 or over the land networks 22.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). It is to be understood that the wireless or non-wireless device 96 may also include a location detection chipset/component (not shown) therein. In this example, the GPS receiver provides accurate time and latitude and longitude coordinates of the device 96 responsive to a GPS broadcast signal received from a GPS satellite constellation.

The cellular chipset/component 40 and/or the wireless embodiment of the device 96 may be an analog, digital, dual-mode, dual-band, multi-mode and/or multi-band cellular phone. The cellular chipset-component 40 and/or wireless device 96 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be a short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the call center 24 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Wireless carrier/communication system 16 may be a cellular telephone system or any other suitable wireless system that transmits signals between the vehicle hardware 26 and/or the wireless embodiment of the device 96 and land network 22. According to an example, wireless carrier/communication system 16 includes one or more cell towers 18, base stations and/or mobile switching centers (MSCs) 20, as well as any other networking components required to connect the wireless system 16 and/or device 96 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a mobile switching center 20 or some other network components as well.

Land network 22 may be a conventional land-based telecommunications network that is connected to one or more landline telephones (e.g., the non-wireless embodiment of device 96) and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Generally, the call center 24 is designed to provide telematics subscribers with a number of different system back-end functions. As an example, the call center 24 may receive and manage emergency related phone call from subscribers. According to the example shown here, the call center 24 generally includes one or more switches 68, servers 70, databases 72, live and/or automated advisors 62, 62', a processor 84, as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The processor 84, which is used in conjunction with the computer equipment 74, is generally equipped with suitable software and/or programs configured to accomplish a variety of call center 24 functions. For example, the processor 84 may be instructed to run a query of the database 72 for one or more outgoing calls from the call center 24. This particular function will be described further hereinbelow in reference to FIG. 2.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices, such as the server 70 and database 72.

The database 72 may be designed to store subscriber profile records, subscriber behavioral patterns, or any other pertinent subscriber information. The database 72 may also be designed to store uploaded information related to incoming calls and/or outgoing calls.

Although the illustrated examples have been described as they would be used in conjunction with a manned call center 24, it is to be appreciated that the call center 24 may be any central or remote facility, manned or unmanned, mobile or fixed, to or from which it is desirable to exchange voice and data communications.

A cellular service provider generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

Figure 2:
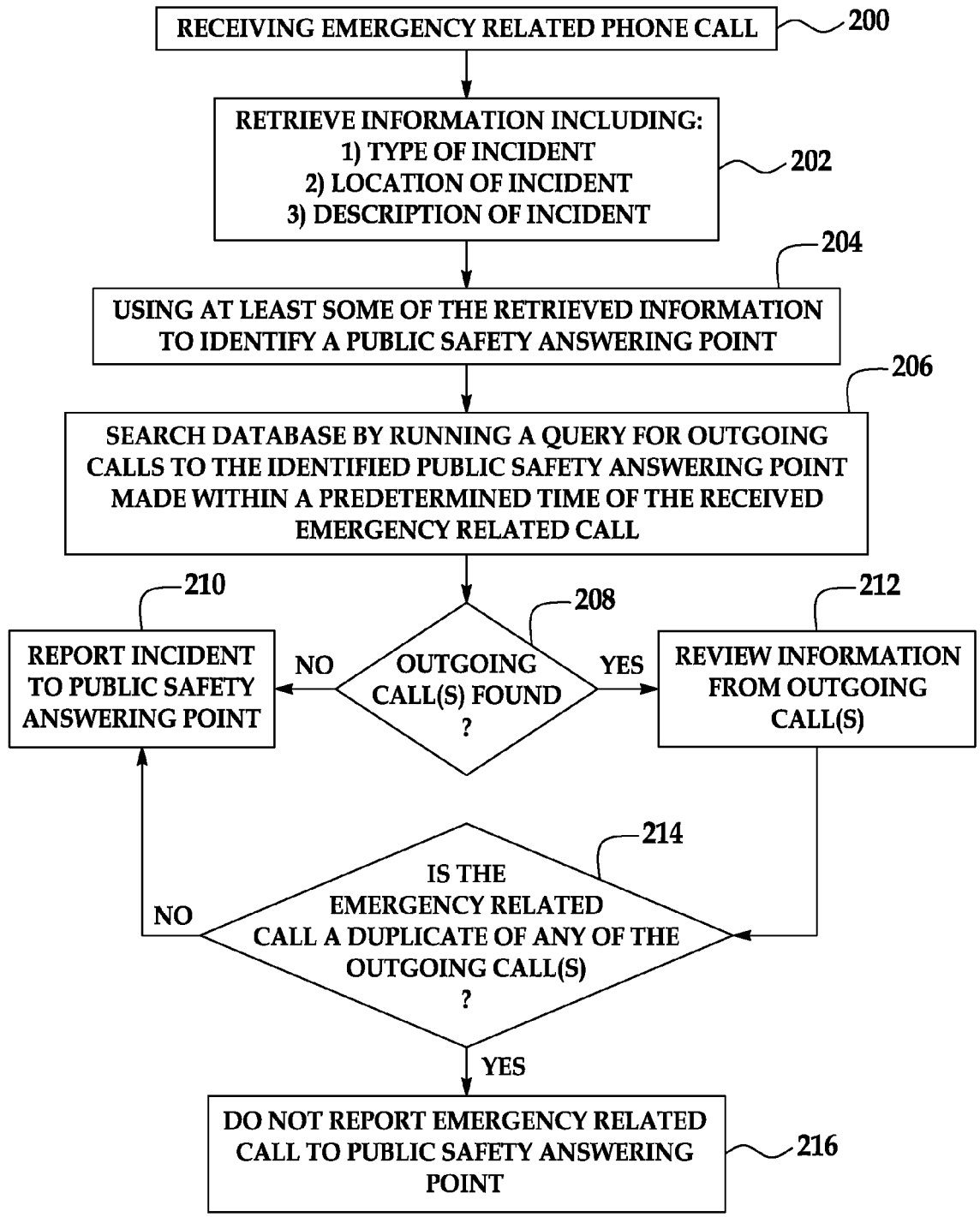
FIG. 2 is a flow diagram of a method for managing emergency calls.

Referring now to FIG. 2, an example of the method of managing emergency calls is depicted. It is to be understood that an "emergency call" or an "emergency related call" refers to a phone call, made to the call center 24 from the subscriber via either the telematics unit 14 or the wireless/non-wireless device 96, during which an incident is reported. Generally, subscribers report such incidents so that the call center 24 can then notify one or more emergency service agencies (e.g., police, fire, ambulance, etc.) of the incident. The incidents generally include emergency situations such as a vehicular accident, a road hazard, a downed power line, a broken down vehicle, a vehicle fire, or any other emergency situation witnessed or experienced by the caller. Furthermore, it is to be understood that the person making the emergency related call may be a victim of the emergency, an eye-witness of the emergency, or another bystander of the emergency.

As shown at reference numeral 200, the method begins when the call center advisor 62 receives the emergency related phone call from the subscriber. This call may be made using the telematics unit 14 or the wireless/non-wireless device 96. During the call, the advisor 62 retrieves information related to i) the type of incident being reported, ii) the location of the incident being reported, and iii) the description of the incident being reported, as shown at reference numeral 202.

Information related to both the type of incident (e.g., accident, fire, etc.) and the description of the incident may be obtained from the caller. For the advisor 62 to make a determination about whether the incident has been previously reported, he/she will need specific details about the incident. In order to obtain the desired information, the advisor 62 may ask one or more questions of the caller. For example, the advisor 62 may ask the caller specifics about any vehicles involved (e.g., make, model, color, etc.), the position of the vehicle(s) (e.g., on the shoulder of the road, upside down, facing oncoming traffic, etc.), the number of people involved, the incident itself (e.g., where in the vehicle a fire is burning, do the wires of a downed power line appear live, is the sink hole across the entire street, etc.), or any other details that are helpful in describing the incident. It is to be understood that in some instances, the information pertaining to the type and description of the incident may be volunteered by the caller without prompting from the advisor 62.

The location information may also be obtained by the caller either voluntarily or by virtue of questions from the advisor 62. When applicable, however, the GPS coordinates of the call may be used to identify the location of the incident. In still other instances, the advisor 62 may verify the location achieved from the GPS coordinates by confirming with the caller the location of the incident.

Once the information is received, the advisor 62 uploads the information to a suitable database 72. The information may be saved for a temporary time period, which may vary, depending on the nature of the incident. As described further hereinbelow, the uploaded information may be used, in conjunction with a flag or other notice that indicates whether or not the incident associated with the information has been reported to a PSAP 92 by other advisors 62 tending to other emergency related phone calls.

At least some of the uploaded information may be used by the advisor 62 to identify a suitable public safety answering point 92 to notify of the incident, as shown at reference numeral 204. The type and description of incident may contribute to the determination of the type of PSAP to contact. For example, if a vehicle fire and no injuries are reported, the appropriate PSAP may include the fire department and the police department. For another example, if a vehicular accident is reported, the appropriate PSAP may include the police department and an ambulance. Furthermore, the location of the incident will help to identify in which PSAP boundary the incident occurred. A listing of public safety answering points servicing particular geographic boundaries may be one of the programs available to the advisor 62 via the database 72, the Internet, or some other computer software. As such, the incident location allows the advisor 62 to make a determination as to which PSAP(s) 92 is/are more appropriate to contact.

Once the suitable PSAP(s) 92 is/are identified, the advisor 62 will search the database 72 for outgoing calls to the identified public safety answering point. This is shown at reference numeral 206 of FIG. 2. All calls made from the call center 24 may be logged in and saved in a temporary cache for some desirable time period. This time period may vary, depending upon the incident. For example, the time period for storing calls related to a downed power line may be longer than the time period for storing calls related to a vehicular accident. The outgoing call log may include the phone number called, a name of a business or person associated with the phone number called (e.g., City X Fire Department, Station 1), and a time at which the outgoing call was made. In some instances, the outgoing call log may also include the name of the advisor 62 that made the call and/or an advisor station of the call center 24 from which the call was made.

The search of the database 72 may include running a query for all calls made from the call center 24 within a predetermined time period prior to the then-current emergency related call. The predetermined time period may depend, at least in part, upon the information received from the caller. For example, if the caller indicates that he/she was in an accident 15 minutes ago, the time period used for the query may be 30 minutes. For another example, if the caller indicates that he/she just happened upon a car fire and does not know how long it has been burning, the time period used for the query may be one or more hours. The query for the search may also be further limited by the location of the identified PSAP 92. For example, in some instances, the query may further specify that the outgoing calls made within the predetermined time period were to a particular area code or a particular phone number.

The results of the search may be in the form of a report (e.g., on a computer screen or in a printed document) indicating any calls that fit the criteria of the query run (see reference numeral 208). If the report indicates that no calls have been made, the query may be changed and run again to double check the accuracy of the first search. This may be accomplished, for example, if the advisor 62 wishes to extend the predetermined time period of the calls searched. Such an additional search is performed at the discretion of the advisor 62. When the results of the one or more searches indicate that no calls have been reported to the identified PSAP 92, the advisor 62 then reports the incident to the PSAP 92, as shown at reference numeral 210.

As shown at reference numeral 212, when the search report indicates that at least one other call has been made to the identified public safety answering point 92, the advisor 62 reviews the information associated with such call(s) to determine whether the other call is a duplicate of the then-current emergency related call, as shown at reference numerals 212 and 214.

More specifically, the information of the other call(s) that is reviewed by the advisor 62 includes the type of incident reported during that/those call(s), the location of the incident reported during that/those call(s), and any further description of the incident reported during that/those call(s). Such information had previously been uploaded to the database 72 via the advisor 62 that serviced the other call(s) and reported the associated incident(s) to the identified PSAP 92.

The information from the other call(s) is compared to the information of the then-current call (i.e., the call that the advisor 62 is currently servicing) to determine whether the then-current call is a duplicate of other calls that have already been reported to the PSAP 92. When making the comparison between the respective sets of information, the advisor 62 is looking for any indication or possibility that the other call(s) was/were related to a different incident than the incident that is the subject of the then-current call. The advisor 62 may check to see if the types of incidents are different, if the locations of the incidents are different, or if any details of the descriptions are different.

In order to increase the speed at which the advisor 62 may effectively review and compare the information, the records in the database 72 (i.e., the information stored for the other call(s)) that are similar and/or identical to data that is received and entered by the advisor 62 for the then-current call, may be highlighted, thereby visually portraying like data fields to the advisor 62 in real time. The fields may be colored, for example, by closeness of data. For example, if the same type of vehicle is involved in the currently reported incident and a previously logged in incident, the field may be colored green. It is to be understood that the software loaded on the advisor's workstation may be configured to arrange and color code the data accordingly.

In one example, if the advisor 62 notices that the vehicle logged in with the details of the other call (i.e., the call identified during the search and that was previously reported to the PSAP 92) is a Chevrolet Suburban, and the then-current caller has indicated that the vehicle is a Hummer, he/she may conclude that the two incidents are not the same. In such an instance, the advisor 62 would conclude that the incident which is the subject of the then-current call should be reported to the identified PSAP 92. It is to be understood that any non-matching information (regardless of the type of non-matching information or how much other information does match) indicates that the then-current call is not a duplicate of the other call(s). Whenever the advisor 62 determines that the then-current call is not a duplicate of previous calls, he/she, in one example, will report the call and incident to the PSAP 92, as shown at reference numeral 210. Generally, the advisor 62 will notify the PSAP 92 if he/she has any doubt about whether the then-current call is a duplicate of the other call(s).

In one embodiment, the advisor 62 informs the caller that he/she will notify the PSAP 92, and upon ending the call with the caller, calls the PSAP 92. In another embodiment, the advisor 62 keeps the caller on hold while contacting the PSAP 92, and then upon ending the call with the PSAP 92, notifies the caller that the incident has been reported and inquires as to whether he/she can be of any more assistance to the caller. In still other instances, the advisor 62 may directly link the caller to the identified PSAP 92, rather than just report the incident to the PSAP 92.

In another embodiment, as a result of the comparison, the advisor 62 may determine that one or more of the calls in the search report is/are duplicate(s) of the then-current call. In such instances, all of the information from the other call(s) is identical to the information of the then-current call. This enables the advisor 62 to conclude with confidence that the incident has already been reported to the identified PSAP 92. In such instances, advisor 62 decides not to contact the PSAP 92, and thus the incident is not again reported to the PSAP 92, as shown at reference numeral 216.

When the incident has already been reported to the identified PSAP 92, the advisor 62 may notify the then-current caller (who is placed on hold during the advisor's review of the information) that an appropriate public safety answering point 92 has been notified. The then-current call then ends, and the advisor 62 becomes available to service another call.

The method and system disclosed herein advantageously reduces the number of redundant reports made to a public safety/service answering point regarding the same incident. As such, the operators at the public safety/service answering point are advantageously not attending to multiple reports of the same incident.

While several examples have been described in detail, it will be apparent to those skilled in the art that the disclosed examples may be modified. Therefore, the foregoing description is to be considered exemplary rather than limiting.

The invention claimed is:

1. A method for managing emergency calls, the method comprising:
   receiving an emergency related call at a call center;
   during the emergency related call, retrieving, from a caller, information related to i) a type of incident being reported, and ii) a description of the incident being reported, and retrieving, from the caller or from GPS coordinates of the call, a location of the incident being reported;
   by a processor running a program, identifying a public safety answering point to notify of the incident based upon at least some of the retrieved information;
   by the processor, searching a database for outgoing calls to the identified public safety answering point;
   generating, by the processor and as a result of the searching, a search report indicating that at least one other call has been made to the identified public safety answering point;
   reviewing information from the at least one other call, the at least one other call information related to i) a type of incident having been reported, ii) a location of the incident having been reported, and iii) a description of the incident having been reported;
   determining whether the emergency related call is a duplicate of the at least one other call; and
   determining, based upon results from the determining whether the emergency related call is the duplicate of the at least one other call, whether to contact the identified public safety answering point.

2. The method as defined in claim 1 wherein prior to identifying the public safety answering point, the method further comprises uploading the retrieved information to the database.

3. The method as defined in claim 1 wherein searching the database includes querying the database for outgoing calls to the identified public safety answering point within a predetermined time period of the received emergency related call.

4. The method as defined in claim 1 wherein the emergency related call is the duplicate of the at least one other call, and wherein the method further comprises determining not to contact the identified public safety answering point.

5. The method as defined in claim 4, further comprising notifying the caller associated with the received emergency related call that the identified public safety answering point has been notified of the incident.

6. The method as defined in claim 1 wherein the emergency related call is not the duplicate of the at least one other call, and wherein the method further comprises contacting the identified public safety answering point.

7. The method as defined in claim 6 wherein when at least one of: i) the type of incident being reported and the type of incident having been reported, ii) the location of the incident being reported and the location of the incident having been reported, or iii) the description of the incident being reported and the description of the incident having been reported are not identical, the information is determined to not match.

8. The method as defined in claim 1 wherein determining whether the emergency related call is the duplicate of the at least one other call includes:
   comparing the information retrieved during the emergency related call and the at least one other call information; and
   determining, from the comparison, whether the information from each of the calls matches.

9. The method as defined in claim 1 wherein the description of the incident being reported includes a description of a vehicle involved in the incident, a description of people involved in the incident, or combinations thereof.

10. The method as defined in claim 1 wherein retrieving the information related to the location of the incident being reported is accomplished via GPS coordinates received with the call or via a caller associated with the emergency related call.

11. The method as defined in claim 1 wherein identifying the public service answering point includes determining a type of public service answering point.

12. The method as defined in claim 11 wherein determining the type of public service answering point is based upon the type of incident being reported, the description of incident being reported, or a combination thereof.

13. A system for managing emergency calls, the system comprising:
   a call center advisor configured to:
   receive an emergency related call at a call center;
   during the emergency related call, retrieve information related to i) a type of incident being reported from a caller, ii) a location of the incident being reported from the caller or from GPS coordinates of the call, and iii) a description of the incident being reported from the caller;
   a call center processor configured to:
   identify a public safety answering point to notify of the incident based upon at least some of the retrieved information; and
   search a call center database for outgoing calls from the call center to the identified public safety answering point; and
   the identified public safety answering point configured to be notified of the incident being reported when the call center advisor determines, based upon results from the search, that the identified public safety answering point should be contacted.

14. The system as defined in claim 13, further comprising a search report generated via the database, the search report indicating that at least one other call has been made to the identified public safety answering point.

15. The system as defined in claim 14 wherein the call center processor is further configured to display to the call center advisor information from the at least one other call, the at least one other call information related to i) a type of incident having been reported, ii) a location of the incident having been reported, and iii) a description of the incident having been reported.

16. The system as defined in claim 14 wherein the at least one other call is a duplicate of the emergency related call.

* * * * *